Feb. 27, 1923.
W. E. BAKER
ANTIFRICTION BEARING
Filed Apr. 9, 1921
1,446,633
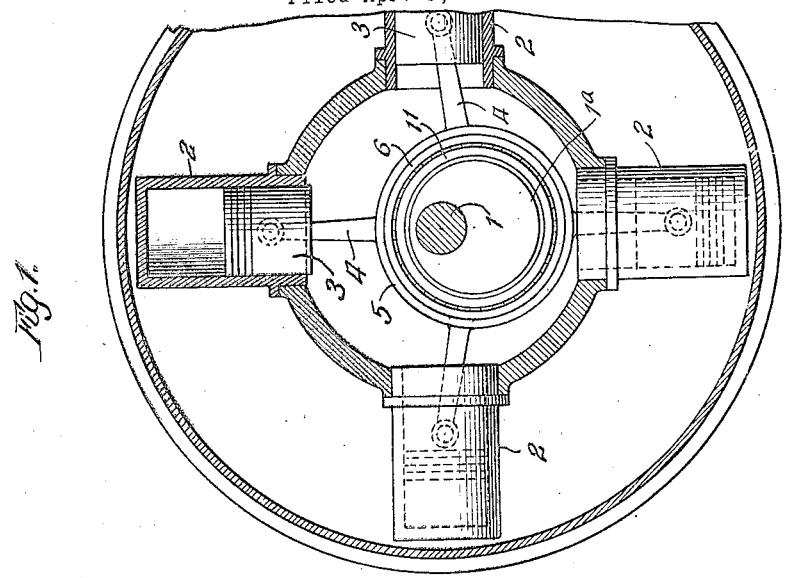
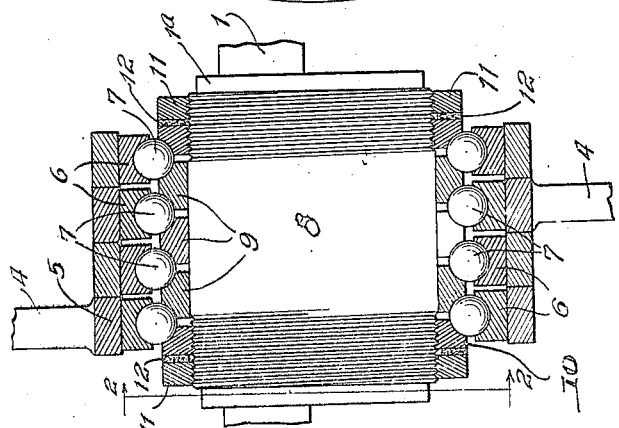
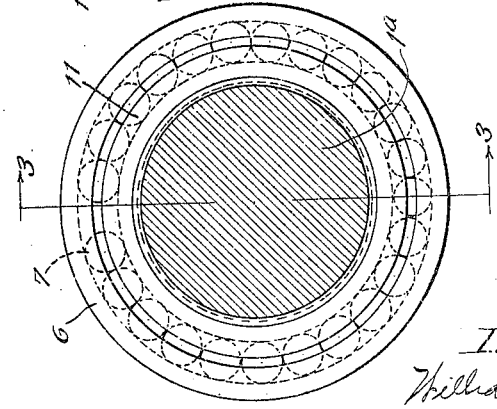
Inventor:
William E. Baker
By: Wm. O. Belt, Atty.

Patented Feb. 27, 1923.

1,446,633

UNITED STATES PATENT OFFICE.

WILLIAM E. BAKER, OF ERIE, PENNSYLVANIA.

ANTIFRICTION BEARING.

Application filed April 9, 1921. Serial No. 460,035.

*To all whom it may concern:*

Be it known that I, WILLIAM E. BAKER, a citizen of the United States, residing at Erie, in the county of Erie and State of Pennsylvania, have invented certain new and useful Improvements in Antifriction Bearings, of which the following is a specification.

My invention relates to bearings and comprises an improved race construction for anti-friction elements.

The objects of my invention are to facilitate assembling of balls or rollers in their races and to provide a simple, effective means for adjusting the races to compensate for wear on same or on the anti-friction elements.

An additional object of my invention is to provide a bearing adapted to be adjusted to nicely fit the parts which are assembled through it.

In illustrating a preferred embodiment of my invention, I have shown it as applied to a fluid pressure engine of the type of which the cylinder pistons rotate about a central shaft and the piston connecting rods are adjacent each other on the crank shaft and all the rods are assembled with the shaft by a plurality of cooperating races and cones.

In the accompanying drawings,

Fig. 1 is a vertical elevation and section through such an engine;

Fig. 2 is an enlarged view of a bearing such as is adapted for the crank shaft and connecting rods of the engine shown in Fig. 1; and Fig. 3 is a section on line 3—3 of Fig. 2.

The crank shaft is indicated at 1, and has an eccentric portion 1ª. The cylinders, pistons and connecting rods are indicated at 2, 3 and 4 respectively. The eccentric enclosing forks 5 of the connecting rods are provided with rings 6, each of which forms an individual outer race for ball bearings 7. Rings 6 are movable transversely of members 5 and relatively to each other.

The crank shaft eccentric 1ª is provided with a boss 8, surrounding which are a plurality of rings 9 and 10 which cooperate to form the cones or inner races for balls 7. Boss 8 is threaded near its ends and the outer rings 10 are threaded and screwed thereon. End rings 11 screwed onto boss 8, form locking nuts for securing cones 10 in position longitudinally of shaft 1. Cones 9 are slidable on boss 8. Washers 12 are preferably inserted between rings 10 and 11.

When the engine is assembled, one cone 10 and its opposed race 6 may be placed on boss 8 and in a fork 5 respectively; a row of balls 7 positioned therein; the adjacent race 9 and cone 6 added; then another row of balls 7, etc., until all of the races 9, and cones 6 and balls 7 are in place. The other ring 10 is now screwed onto boss 8 and as it is screwed towards the first ring 10, balls 7 are thrust outwardly until the proper fit between the races and cones is obtained. During this movement, rings 6 and 9 will automatically be moved axially of shaft 1 to their proper positions. Rings 11 will be applied when the final adjustment is made and will lock rings 10 against spreading.

It will be noted that rings 10 may be moved axially to shift the entire bearing longitudinally of shaft 1 as well as to vary the radial position of balls 7.

It will be understood that cylindrical or tapered rollers and corresponding cages may be substituted for the ball bearings illustrated, without departing from the spirit of my invention and I am aware that other changes in the form and construction of parts and details of construction may be made without departing from the invention or sacrificing the advantages thereof and I reserve the right to make all such changes and modifications as are fairly possible within the scope of the following claims.

I claim:

1. The combination in an anti-friction bearing, of a plurality of parallel outer races, a plurality of laterally spaced, parallel inner races, anti-friction elements retained between one of said outer races and two of said inner races, and means for moving said inner races towards each other.

2. The combination of a shaft with a plurality of spaced rings movable axially thereon, a quadrantal groove in each ring opposing a similar groove in the adjacent ring, a single grooved ring co-operating with said rings to form races for anti-friction elements, anti-friction elements retained between said rings, a member mounted on said single ring, and means for adjusting said spaced rings axially of said shaft.

3. In an anti-friction bearing, the combination of a plurality of movable outer rings, a plurality of adjustable inner rings, each outer ring co-acting with two inner rings to form a race for balls, and means for adjustably securing said inner rings in place.

WILLIAM E. BAKER.